(12) United States Patent
Gans

(10) Patent No.: US 10,963,168 B2
(45) Date of Patent: Mar. 30, 2021

(54) MEMORY SYSTEM AND OPERATIONS OF THE SAME

(71) Applicant: Micron Technology, Inc., Boise, ID (US)

(72) Inventor: Dean D. Gans, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 87 days.

(21) Appl. No.: 16/248,685

(22) Filed: Jan. 15, 2019

(65) Prior Publication Data

US 2020/0225853 A1 Jul. 16, 2020

(51) Int. Cl.
*G06F 3/06* (2006.01)
*G06F 12/0802* (2016.01)

(52) U.S. Cl.
CPC .......... *G06F 3/0622* (2013.01); *G06F 3/0646* (2013.01); *G06F 3/0673* (2013.01); *G06F 12/0802* (2013.01); *G06F 2212/7203* (2013.01)

(58) Field of Classification Search
CPC .... G06F 3/0622; G06F 3/0646; G06F 3/0673; G06F 12/0802; G06F 2212/7203
See application file for complete search history.

(56) References Cited

U.S. PATENT DOCUMENTS

| | | | |
|---|---|---|---|
| 6,705,877 B1 * | 3/2004 | Li | H05K 1/144 |
| | | | 257/686 |
| 2006/0067141 A1 * | 3/2006 | Perego | G06F 13/1684 |
| | | | 365/200 |
| 2006/0170453 A1 * | 8/2006 | Zerbe | G11C 7/1057 |
| | | | 326/37 |
| 2006/0277434 A1 * | 12/2006 | Tsern | G06F 11/0793 |
| | | | 714/17 |
| 2010/0026533 A1 | 2/2010 | Hollis | |
| 2015/0187441 A1 | 7/2015 | Hollis | |
| 2017/0212695 A1 * | 7/2017 | Hollis | G06F 13/4282 |
| 2018/0366443 A1 * | 12/2018 | Keeth | H01L 25/0657 |

OTHER PUBLICATIONS

ISA/KR, International Search Report and Written Opinion of the International Searching Authority, Int'l Appl. No. PCT/US2019/069112, dated May 4, 2020, Korean Intellectual Property Office, Seo-gu, Daejeon, Republic of Korea, 16 pgs.

* cited by examiner

*Primary Examiner* — Nimesh G Patel
(74) *Attorney, Agent, or Firm* — Holland & Hart LLP

(57) ABSTRACT

Methods, systems, and devices related to a memory system or scheme that includes a first memory device configured for low-energy access operations and a second memory device configured for storing high-density information and operations of the same are described. The memory system may include an array configured for high-density information and may interface with a host via a controller and a cache or another array of a relatively fast memory type. The memory system may support signals communicated according to one or several modulation schemes, including a modulation scheme or schemes that employ two, three, or more voltage levels (e.g., NRZ, PAM4). The memory system may include, e.g., separate channels configured to communicate using different modulation schemes between a host and between memory arrays or memory types within the memory system.

35 Claims, 9 Drawing Sheets

MEMORY SYSTEM AND OPERATIONS OF THE SAME

BACKGROUND

The following relates generally to a system that includes at least one memory device and more specifically to memory system and operations of the same.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

Improving memory systems, generally, may include reducing system power consumption, increasing memory system capacity, improving read/write speeds, providing non-volatility by use of persistent main memory, or reducing manufacturing costs at a certain performance point, among other metrics.

DETAILED DESCRIPTION

Figure 1:
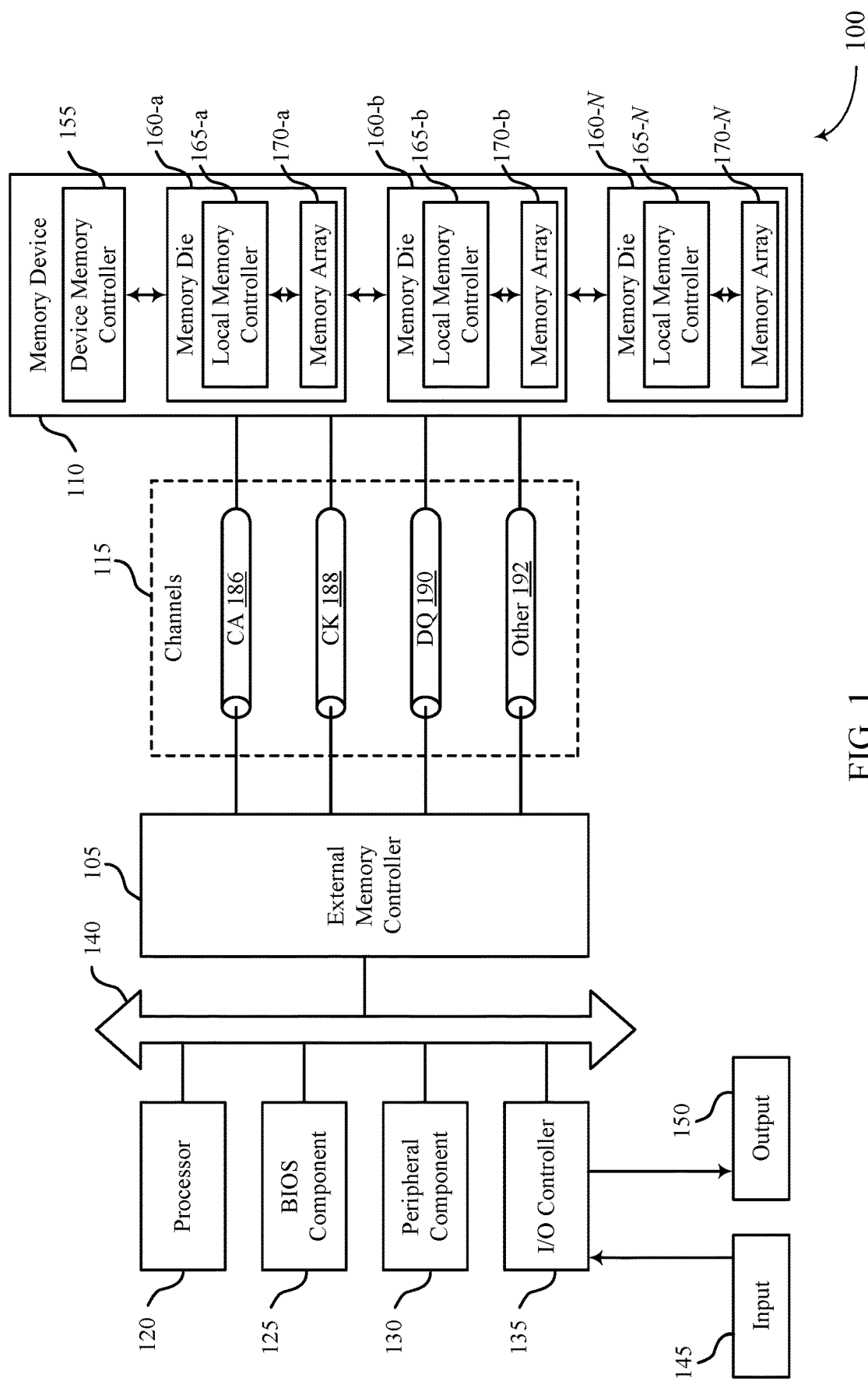
FIG. 1 illustrates an example of a system that supports a memory system and operations of the same in accordance with examples as disclosed herein.

A memory system may include one or more memory devices and a controller configured to facilitate access operations for a host device (e.g., a system on chip (SoC), or processor) that may be coupled with the memory system. In some examples, the host device may operate in mobile environments executing high-performance operations and access the memory system. In some cases, such high-performance operations may include transferring a large amount of data per a fixed amount of time in and out of the memory system—e.g., high-bandwidth operations.

High-bandwidth operations may increase an operating temperature of a memory system (e.g., operating temperatures of one or more memory devices in a memory system). In some cases, systems may be thermally limited, thereby limiting the bandwidth of some memory devices. In other words, a bandwidth of a memory system may be reduced while executing high-performance operations to maintain an operating temperature of the memory system below a temperature threshold. In some cases, reducing power consumption of a memory device (e.g., low-power DRAM) within a memory system may be insufficient to mitigate the thermally-induced bandwidth limitations. Further, cost impact may hinder increasing a quantity of pin count of a memory system that may provide a wide input/output (I/O) configuration to mitigate the thermally-induced bandwidth limitations, in some applications (e.g., mobile applications).

A memory system and operations of the same are described. The memory system may include a first memory device (e.g., a fast cache device) configured for access operations according to a first energy-per-bit rating (e.g., low-energy access operations) and a second memory device configured for storing high-density of information according to a second energy-per-bit rating that is greater than the first energy-per-bit rating. To facilitate high-bandwidth operations, the first memory device may be configured for communicating signals with the host device using a modulation scheme that includes three or more voltage levels—e.g., pulse-amplitude modulation (PAM). Such modulated signals may increase an amount of information transferred during a fixed amount of time when compared to a signal carrying binary information (e.g., a signal carrying information in two voltage levels). In this manner, a bandwidth of a memory system may be increased without increasing a pin count of the memory system (e.g., mitigating a cost impact). To facilitate other operations, the first memory device may be configured for communicating signals with the second memory device or other components of the memory system using a modulation scheme that includes two voltage levels—e.g., non-return-to-zero (NRZ).

Further, the first memory device may be configured for low-energy access operations by maintaining a relatively short conductive paths (e.g., access lines) between interfaces and memory cells (e.g., DRAM memory cells). In some cases, the first memory device may include a relatively low density of memory cells (e.g., DRAM cells). In some examples, the first memory device may include one (1) to four (4) giga-bits of memory cells. The conductive paths may include access lines (e.g., word lines, digit lines) associated with the memory cells and shorter access line lengths may reduce activation energy—e.g., voltage and time associated with activating or deactivating access lines during an access operation. In some cases, the shorter access line lengths may reduce various latencies associated with access operations—e.g., $t_{RCD}$ (row address to column address delay). In this manner, the memory device (e.g., low-power DRAM die with high-bandwidth capability) may support a high-bandwidth, low-energy memory system.

In some cases, the memory system may include one or more additional memory devices (e.g., the second memory device) that may function as main memory (which may be referred to as memory media). The memory media may be configured to store high-density of information. In some cases, the memory media may include volatile memory cells (e.g., DRAM), non-volatile memory cells (e.g., FeRAM, PCM, 3DXpoint™ memory), or both. The first memory device (e.g., a low-power, high-bandwidth DRAM die) may be coupled with the memory media of the memory system such that the first memory device may provide functionalities that are similar to a cache memory coupled with a host device. Further, the memory system may include a controller configured to facilitate access operations in conjunction with a host device coupled with the memory system, the memory device, and the memory media. In some cases, the controller may determine a location of a set of data (e.g., determining whether a set of data is stored in the memory device or in the memory media) requested by a host device during an access operation. The controller may execute various subsequent operations based on the determination.

Features of the disclosure are initially described in the context of a memory system and memory die as described with reference to FIGS. 1 and 2. Features of the disclosure are described in the context of a high-bandwidth, low-energy memory system and memory device as described with reference to FIGS. 3 and 4. These and other features of the disclosure are further illustrated by and described with reference to apparatus diagrams and flowcharts that relate to memory system and operations of the same as described with references to FIGS. 5-9.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card. In some cases, a host device may be configured to communicate control information with a memory system (e.g., a memory device 110). Control information may include command and address information for a set of data stored in the memory system. In some cases, the host device may transmit or receive, to or from the memory system, a first set of signals modulated using a first modulation scheme that includes three or more voltage levels.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB)

controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-*a*, local memory controller 165-*b*, and/or local memory controller 165-N) and a memory array 170 (e.g., memory array 170-*a*, memory array 170-*b*, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

In some cases, the memory device 110 may include a memory die configured for low-energy access operations (e.g., access operations according to a first energy-per-bit rating that may be less than a second energy per bit rating) by maintaining a relatively low density of memory cells (e.g., DRAM cells). In some examples, the memory device may include one (1) to four (4) giga-bits of memory cells. Such low densities of memory cells may facilitate reducing energy consumption associated with various conductive paths due to inherently shorter distances that data may travel between memory cells storing the data and pins of the memory device during an access operation. Further, the memory device 110 may include one or more additional memory dice that may function as main memory (which may be referred to as memory media). The memory media may be configured to store high-density of information (e.g., storing high-density of information according to the second energy-per-bit rating that may be greater than the first energy-per-bit rating). In some cases, the memory media may include volatile memory cells (e.g., DRAM), non-volatile memory cells (e.g., FeRAM, PCM, 3DXpoint™ memory), or both. In this manner, the memory device 110 may include a memory die (e.g., a low-power, high-bandwidth DRAM die) coupled with one or more additional memory dice (e.g., memory media) such that the memory die may provide functionalities that are similar to a cache memory coupled with a host device.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-*a*, memory die 160-*b*, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120).

In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like. In some cases, the device memory controller 155 may determine a location of a set of data (e.g., determining whether a set of data is stored in a memory die that may serve as a cache memory or in a different memory die that may serve as a main memory) requested by a host device during an access operation. The controller may execute various subsequent operations based on the determination as described herein.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120. In some cases, the local memory controller 165 may identify a first mode of operation for communicating a set of data with a host device based on receiving command and address information from the host device. The first mode of operation may be configured for signaling using a first modulation scheme that includes three or more voltage levels. Further, the local memory controller 165 may transmit, to the host device through a second interface coupled with the host device, where a first set of signals may be modulated using the first modulation scheme that include the set of data based on operating in the first mode of operation.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, NRZ, unipolar encoding, bipolar encoding, Manchester encoding, PAM having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
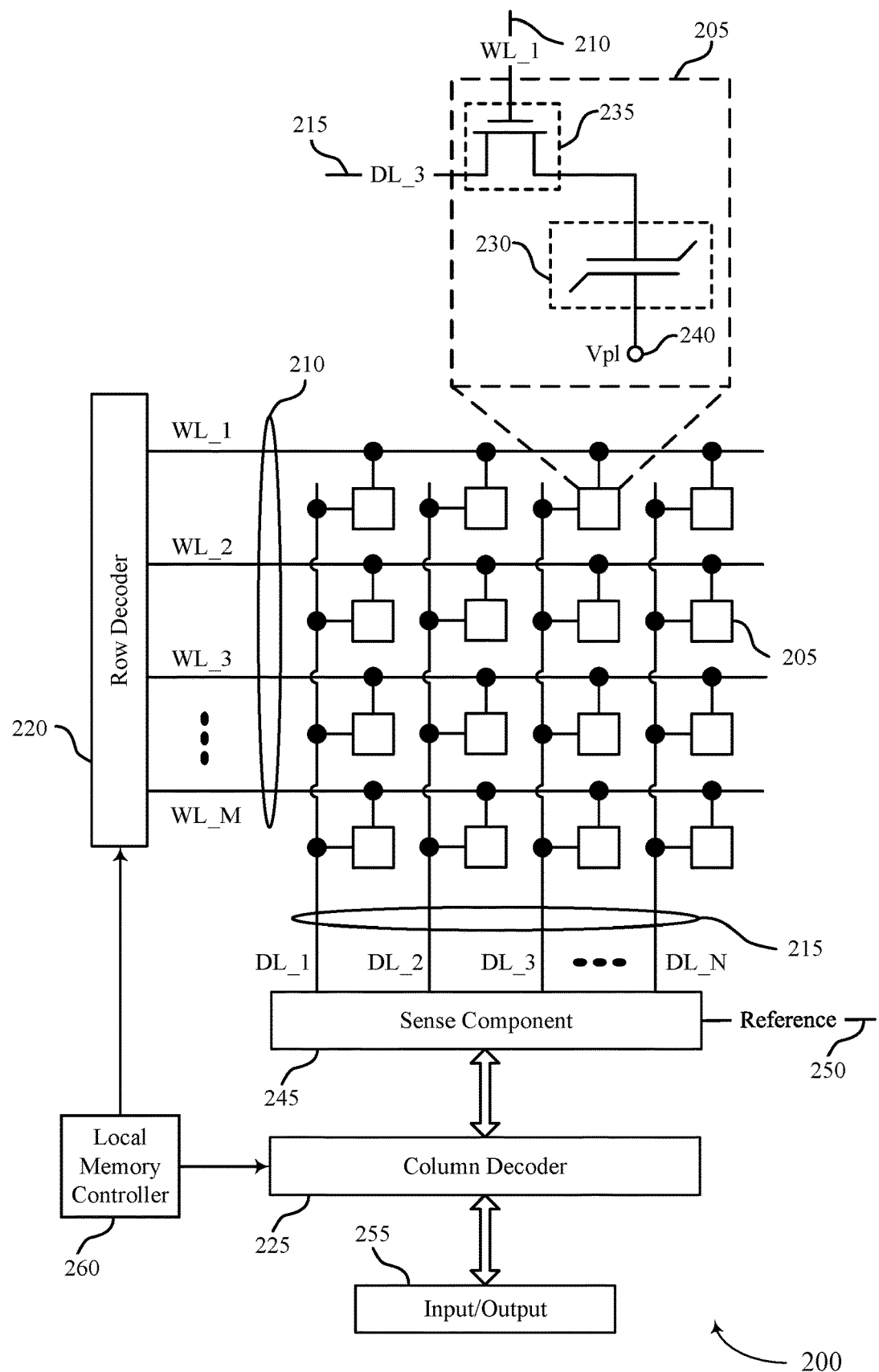
FIG. 2 illustrates an example of a memory die that supports a memory system and operations of the same in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, ora logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

In some cases, conductive paths of the memory die 200 may include access lines (e.g., word line 210, digit line 215) associated with the memory cells 205. In some cases, the memory die 200 may be configured for low-energy access operations by maintaining a relatively low density of memory cells (e.g., DRAM cells)—for example, access operations according to the first energy-per-bit rating that may be less than the second energy-per-bit rating. In some cases, an energy-per-bit rating may alternatively be referred to as a nominal energy-per-bit rating. Shorter access line lengths based on the low density of memory cells may reduce activation energy—e.g., voltage and time associated with activating or deactivating access lines during an access operation. In some cases, the shorter access line lengths may reduce various latencies associated with access operations—e.g., $t_{RCD}$ (row address to column address delay).

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through column decoder 225 as output 255. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may receive, from a host device as part of an access operation, command and address information through a first interface coupled with a controller (e.g., device memory controller 155) of a memory system (e.g., memory device 110), the command and address information associated with a set of data stored in an array of memory cells. Further, the local memory controller 260 may identify a first mode of operation for communicating the set of data with the host device based on receiving the command and address information, where the first mode of operation may be configured for signaling using a first modulation scheme that includes three or more voltage levels and a second mode of operation may be configured for signaling using a second modulation scheme that includes two voltage levels.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
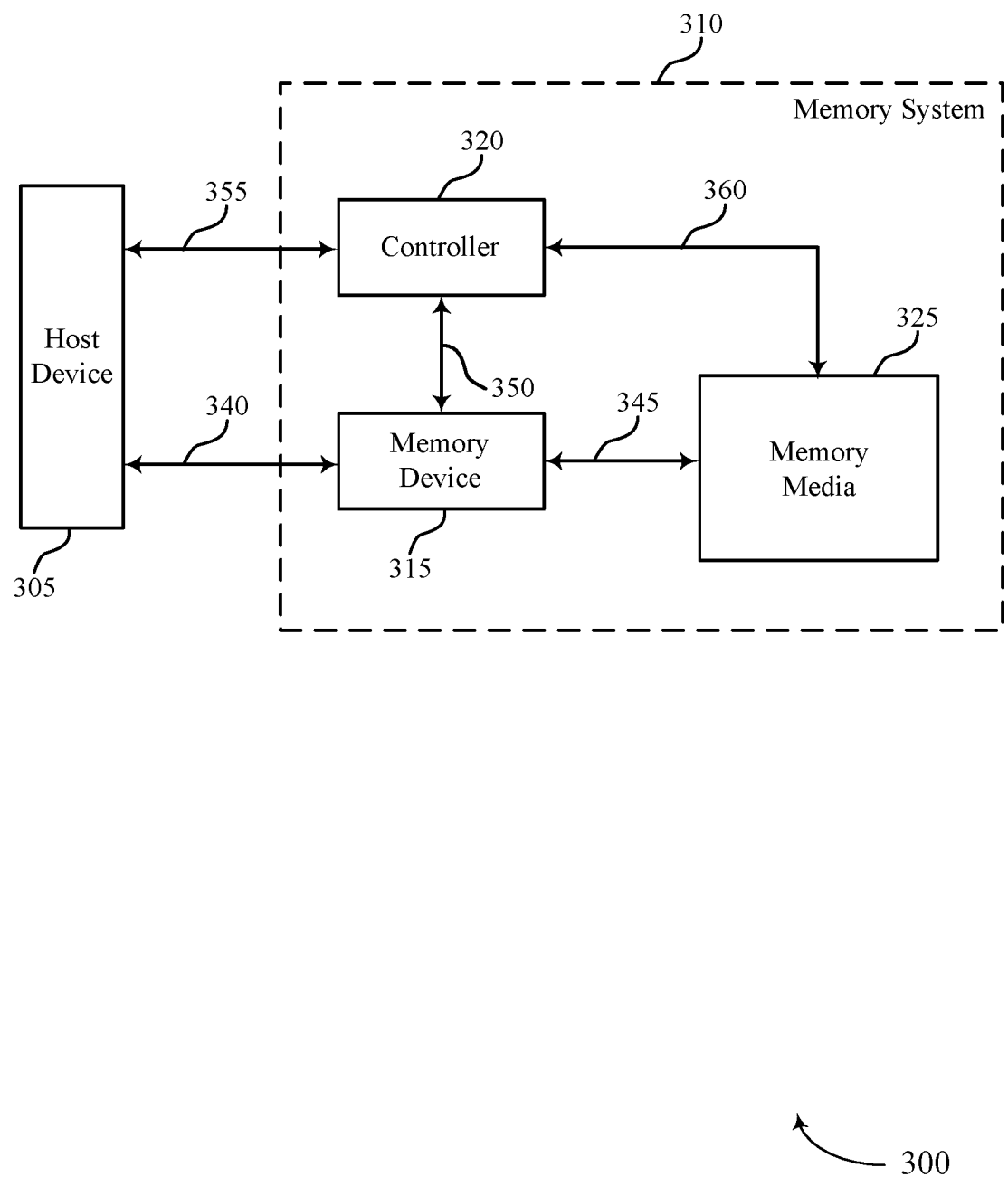
FIG. 3 illustrates an example of a system that supports a memory system and operations of the same in accordance with examples as disclosed herein.

FIG. 3 illustrates an example of a system 300 that supports a memory system and operations of the same in accordance with examples as disclosed herein. System 300 may include aspects of system 100 as described with reference to FIG. 1 and may include host device 305 and memory system 310. Host device 305 may an example of the host or host device described with reference to FIG. 1. Memory system 310 may be or include aspects of memory device 110 described with reference to FIG. 1. Memory system 310 may include memory device 315, controller 320, and memory media 325. Memory device 315 may be an example of memory die 160 or memory die 200 as described with reference to FIGS. 1 and 2. Controller 320 may be an example of device memory controller 155 described with reference to FIG. 1. Memory media 325 may be an example of memory die 160 described with reference to FIG. 1. In some cases, memory media 325 may include one or more memory dice 160 and function as a main memory based on a specified memory capacity of memory system 310. Host device 305 may be coupled with memory device 315 via channel 340 and controller 320 via channel 355. Memory device 315 may be coupled with controller 320 via channel 350 and memory media 325. Further, controller 320 may be coupled with memory media via channel 360. Channels (e.g., channel 340, channel 345, channel 350, channel 355, channel 360) depicted in FIG. 3 may include aspects of channels 115 described with reference to FIG. 1.

Memory device 315 may include a set of memory cells (e.g., DRAM cells) and may be configured for low-energy access operations—e.g., access operations according to a first energy-per-bit rating that may be less than a second energy-per-bit rating. Memory device 315 may include aspects of a low-power DRAM device described herein. For example, memory device 315 may include a relatively low density of memory cells (e.g., one (1) to four (4) giga-bits of DRAM cells) to facilitate the low-energy access operations. In other examples, the memory device 315 may include relatively short conductive paths between memory cells and interfaces. Such shorter conductive may facilitate reducing energy consumption associated with various conductive paths due to the shorter distances that data may travel between the memory cells storing the data and pins of memory device 315 during the low-energy access operations. In some cases, the reduced length of conductive paths may be based at least in part on the relatively low density of memory cells. In some cases, memory device 315 may include a set of conductive paths configured for the one or more access operations of the set of memory cells having a first density and a first energy-per-bit rating. In some cases, the memory cells may be partitioned into two or more group of memory cells to further reduce the distances that data may travel. The conductive paths may include access lines (e.g., word lines, digit lines) associated with the memory cells and shorter access line lengths based on the low density of memory cells may reduce activation energy—e.g., voltage and time associated with activating or deactivating access lines during the low-energy access operations. In some cases, the shorter access line lengths may reduce various latencies associated with the low-energy access operations—e.g., $t_{RCD}$ (row address to column address delay).

Controller 320 may be coupled with memory device 315, memory media 325, and configured to receive control information from host device 305. The controller 320 may facilitate low-energy access operations for host device 305. In some cases, the controller 320 may determine a location of a set of data (e.g., determining whether a set of data is stored in memory device 315 or in memory media 325) indicated by the control information during the low-energy access operations. In some cases, controller 320 may transmit to memory device 315 (e.g., via channel 350) a command to cause memory device 315 to transmit the data to host device 305 (e.g., via channel 340) based on determining that the data is stored in memory device 315. The control information may be an example of command/address information received from the host device 305 over one or more command/address channels 355.

Memory media 325 may include a second set of memory cells and configured for storing information in the second set of memory cells according to the second energy per bit rating that may be greater than the first energy-per-bit rating. In some cases, memory media 325 may include two or more memory dice (e.g., two or more memory dice 160 described with reference to FIG. 1). In some cases, memory media 325 may be referred to as main memory of memory system 310. In some cases, memory media 325 may include volatile memory cells (e.g., DRAM cells), or non-volatile memory cells (e.g., FeRAM cells, PCM cells, 3DXpoint™ memory cells) or both. In some cases, memory media 325 may support relaxed bandwidth and latency parameters (as compared to the memory device 315) because memory device 315 may function as a buffer between the host device 305 and the memory media 325. As such, memory media 325 may provide a lower cost per bit as well as a higher storage capacity at a given form factor. In some cases, memory device 315 functioning as a buffer may hide some operational aspects of memory media 325 (e.g., media management operations) from host device 305 to facilitate using certain non-volatile memory cell in memory media 325.

Host device 305 may be configured to operate with memory system 310 via channel 340 and channel 355. Channel 340 may be coupled with memory device 315 and configured to communicate a first signal (e.g., a set of data) that may be modulated using a first modulation scheme that includes three or more voltage levels—e.g., PAM4 modulation scheme. In some cases, the first modulation scheme may include four (4) voltage levels and may be referred to as PAM4 modulation scheme. Such a signal (e.g., the first signal modulated with PAM4 modulation scheme) may increase an amount of data transferred during a fixed amount of time to increase a bandwidth of memory system 310. Examples of first modulation schemes include, but are not limited to, PAM4, PAM8, etc., QAM, QPSK, and/or others.

Channel 355 may be configured to communicate control information (e.g., command and address information) associated with low-energy access operations between controller 320 and host device 305. In some cases the control information may be modulated using a second modulation scheme that includes two voltage levels. In some cases, the second modulation scheme may include the NRZ modulation scheme. In some cases, channel 355 may be configured to support an industry standard specification, such as low-power double data rate memory specification (e.g., DDR2, DDR3, DDR4, LPDDR2, LPDDR3, LPDDR4, LPDDR5, GDDR4 or GDDR5 specifications, or beyond). In some cases, channel 355 may include pins configured to transmit or receive various information associated with low-energy access operations—e.g., information indicating a set of data to store in memory device 315, an increased latency when a set of data requested by host device 305 is absent in memory device 315, a transaction identification for an access operation being executed out of order.

Memory device 315 may be coupled with memory media 325 via channel 345. Channel 345 may be configured to communicate a second signal between memory device 315 and memory media 325 that may be modulated using the second modulation scheme (e.g., NRZ modulation scheme). Further, controller 320 may be coupled with memory media 325 via channel 360. Channel 360 may be configured to communicate the control information between controller 320 and memory media 325 via signals modulated using the second modulation scheme (e.g., NRZ modulation scheme). In some cases, channel 360 may be configured to support several types memory dice included in memory media 325 (e.g., DRAM, FeRAM, PCM, 3D XPoint™ memory).

The controller 320 may determine to store a set of data in memory device 315 or memory media 325. In some cases, host device 305 may provide information associated with a set of data to controller 320 such that controller 320 may store the set of data in memory device 315 (or in memory media 325) according to the information provided by host device 305. In other cases, controller 320 may add several bits to address bits of a set of data to indicate that the set of data may be suitable to store in memory device 315 (or in memory media 325) based on a past access history associated with the set of data. In some cases, controller 320 may determine to store a set of data in memory device 315 based on characteristics of the set of data associated with access operations—e.g., a set of data related to a frame buffer for a graphics processing unit (GPU). Further, controller 320 may update and track a location of a set of data (e.g., address of a set of data) based on the most recent access operation directed to the set of data.

The controller 320 may receive, from host device 305 over channel 355, a first signal including command and address information for a set of data stored in memory system 310. In some cases, the signal may have been modulated using the second modulation scheme (e.g., NRZ modulation scheme). Controller 320 may determine whether the set of data is stored in memory device 315 or the memory media 325 based on receiving the command and address information. Subsequently, controller 320 may transmit, from memory device 315 to host device 305 over channel 340, a second signal including the set of data based on the determination, where the second signal may have been modulated using the first modulation scheme (e.g., PAM4 modulation scheme). The second signal modulated with PAM4 modulation scheme may allow the memory system 310 to perform high-bandwidth operations by alleviating thermally-induced bandwidth limitation issues as described herein.

In some cases, controller 320 may determine that the set of data is stored in memory device 315 (e.g., a cache hit on a read command). The controller 320 may then transmit, to memory device 315 over channel 350, the command and address information such that memory device 315 access the data indicated in the command and address information. The memory device 315 may transmit the data indicated in the command and address information using a second signal to the host device based on the command and address information.

In other cases, controller 320 may determine that the set of data is absent from memory device 315—for instance, the set of data is stored in memory media 325 (e.g., a cache miss on a read command). Controller 320 may transmit, to memory media 325 over channel 360, the command and address information. Subsequently, controller 320 (in conjunction with memory media 325) may transmit, from memory media 325 to memory device 315 over channel 345, a third signal including the set of data indicated by the command and address information. In some cases, the third signal may have been modulated with the second modulation scheme (e.g., NRZ modulation scheme).

In some cases, controller 320 may transmit, to host device 305 over channel 355, an indication of increased latency for performing a read operation based on determining that the set of data is absent from memory device 315. In some cases, controller 320 may transmit, to host device 305 over channel 355, information indicating that at least some low-energy access operations associated with the set of data being executed out of order based on determining that the set of data is absent from memory device 315.

In some cases, controller 320 may receive, from host device 305 over channel 355, control information for a set of data stored in memory system 310 including memory device 315. The control information may include a logical address of the set of data associated with a read operation. Subsequently, controller 320 may determine a location of the set of data in memory device 315 or memory media 325 based on receiving the control information. In some cases, controller 320 may transmit, to memory device 315 over channel 350, a first command to cause memory device 315 to transmit the set of data to host device 305 over channel 340 using the first modulation scheme including three or more voltage levels (e.g., PAM4 modulation scheme).

In some cases, controller 320 may identify that the set of data is stored in memory device 315. In other cases, controller 320 may identify that the set of data is stored in memory media 325. Subsequently, controller 320 may transmit, to memory media 325 over channel 360, a second command to cause memory media 325 to transmit the set of data to memory device 315 over channel 345 using the second modulation scheme that includes two voltage levels (e.g., NRZ modulation scheme), based on identifying that the set of data is stored in memory media 325. In some cases, controller 320 may update the logical address of the set of data based on transmitting the second command to memory media 325. Further, controller 320 may transmit, to host device 305 over channel 355, an indication of increased latency based on identifying that the set of data is stored in memory media 325.

The controller 320 may identify that the set of data is stored in memory media 325. Subsequently, controller 320 may transmit, to host device 305 over channel 355, transaction identification information configured to support the read operation being executed out of order based on identifying that the set of data is stored in memory media 325. In some cases, memory media 325 may be configured for storing information that is configured for high-density storage of the information—e.g., storing information according to the second energy per bit rating that may be greater than the first energy-per-bit rating.

Figure 4:
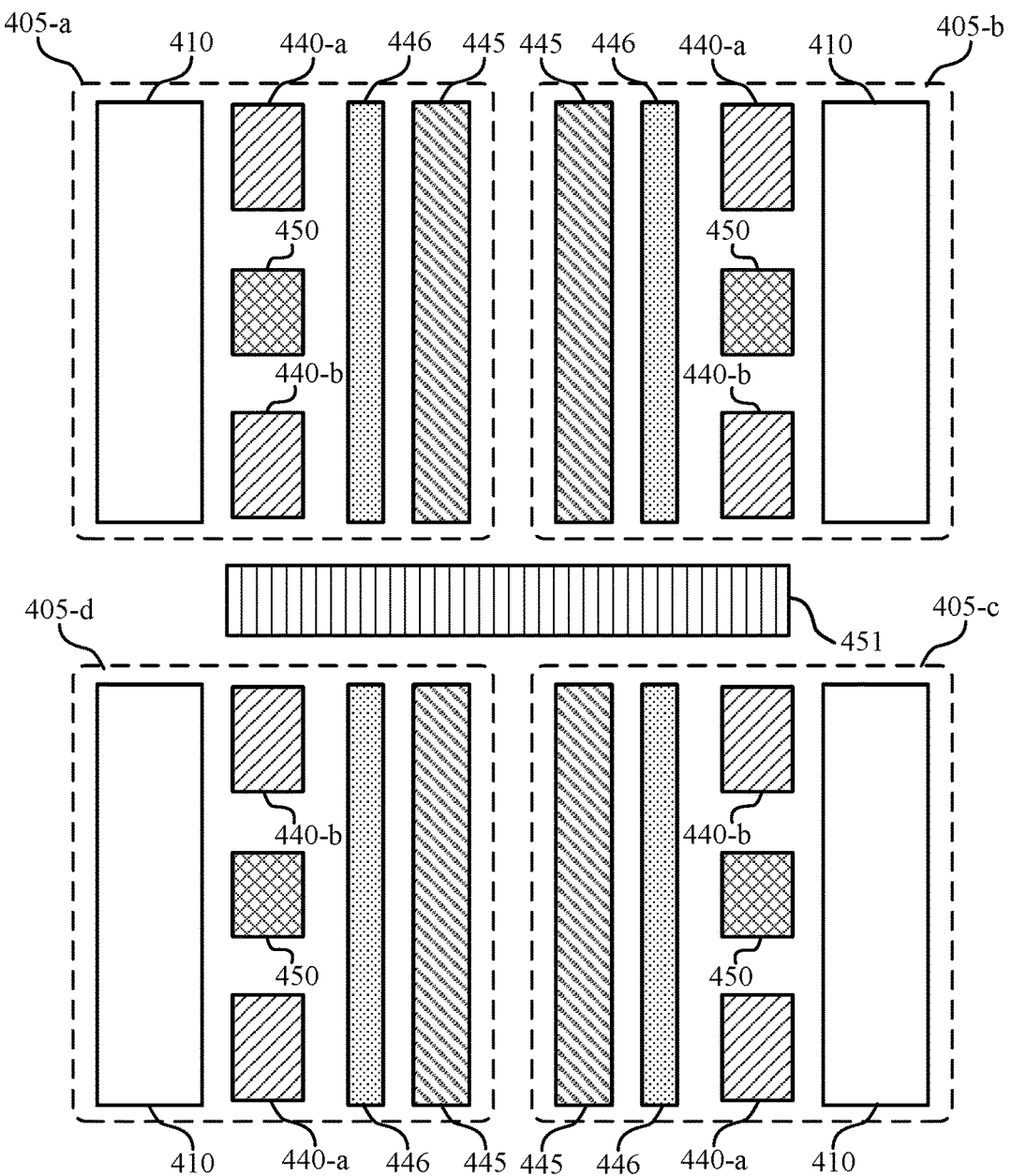
FIG. 4 illustrates an example of a memory device that supports a memory system and operations of the same in accordance with examples as disclosed herein.

FIG. 4 illustrates an example of memory device 400 that supports a memory system and operations of the same in accordance with examples as disclosed herein. Memory device 400 may include aspects of memory dice 160, memory die 200, memory device 315 as described with reference to FIGS. 1 through 3. By way of example, memory device 400 may include four (4) portions (e.g., portion 405-a, portion 405-b, portion 405-c, portion 405-d), but the present disclosure is not limited to that—e.g., memory device 400 may include any quantity of portions (two portions, four portions, six portions, eight portions, ten portions, etc.). Each portion 405 may include one or more arrays 410 of memory cells (e.g., memory cells 205 described with reference to FIG. 2), first interface 440, second interface 445, and third interface 450. Memory device 400 may include additional interface 451 that may be configured to communicate various signals with an interface controller (e.g., controller 320) of a memory system. Interfaces depicted in FIG. 4 (e.g., first interface 440, second interface 445, third interface 450, additional interface 451) may be coupled with or include aspects of the channels described with reference to FIG. 3 (e.g., channel 340, channel 345, channel 350, channel 355, channel 360). Each of these components depicted in FIG. 4 may communicate, directly or indirectly, with one another via one or more internal buses that are omitted in FIG. 4 to improve clarity of illustrating the components. The locations and sizes of various components depicted in FIG. 4 are for illustrative purposes and are not limiting.

Array 410 may include an array of memory cells having a first density and a set of conductive paths that may be relatively shorter than conductive paths of other types of memory devices. In some cases, the set of conductive paths of the array 410 may be configured for one or more access operations of the array of memory cells having a first energy-per-bit rating. In other words, array 410 may be configured to operate as a buffer (e.g., cache memory) of a main memory (e.g., memory media 325) of a memory system rather than to store a large quantity of information. In some cases, memory device 400 may include a total quantity of memory cells amounting to one (1) to four (4) giga-bits of memory cells in comparison to that of a memory device configured to store a large quantity of information (e.g., sixty-four (64) giga-bits). The relatively shorter conductive paths (e.g., data paths) that data may travel between memory cells storing the data and data pins of memory device 400 during an access operation may reduce the energy consumption associated with an operation and may thus reduce the thermal profile of the memory device. The conductive paths may include access lines (e.g., word lines, digit lines) associated with the memory cells and shorter access line lengths based on the low density of memory cells may reduce activation energy—e.g., voltage and time associated with activating or deactivating access lines during an access operation. In some cases, the shorter access line lengths may reduce various latencies associated with access operations—e.g., $t_{RCD}$ (row address to column address delay). In some cases, the conductive paths may include access lines associated with memory cells of the array 410, or one or more conductive components located between the memory cells and first interface 440, or both.

First interface 440 may be configured to communicate with a host device (e.g., host device 305 described with reference to FIG. 3). In some cases, first interface 440 may be referred to as a frontend interface. In some cases, first interface 440 may include a set of channels (e.g., four (4) channels) that each may be ×16 channel. In some cases, each ×16 channel may include two (2) pseudo-channels to maintain a given length of minimum address length (MAL)—e.g., thirty-two (32) bytes long MAL. In some cases, first interface 440 may be configured to support one or more burst lengths (BL)—e.g., BL of 16, BL of 32, BL of 64. In some cases, a certain BL may be associated with an operation mode of memory device 400 (or a memory system that includes memory device 400)—e.g., BL of 16 for a high-speed (HS) mode, BL of 32 for a low-speed (LS) mode, to facilitate maintaining a given pre-fetch size regardless of the operation mode.

First interface 440 may be configured to communicate a first set of signals to and from array 410 of memory cells, where the first set of signals may have been modulated using a first modulation scheme that includes three or more voltage levels (e.g., PAM4 modulation scheme). In some cases, memory device 400 may include one or more first interfaces 440 (e.g., four first interfaces 440) based on a quantity of portions 405 within memory device 400. In some cases, first interface 440 may include one or more channels configured to carry the first set of signals, where the first set of signals are capable of being modulated using the first modulation scheme or a second modulation scheme that includes two voltage levels (e.g., NRZ modulation scheme).

Further, the first set of signals may be communicated using a set of different burst lengths (BLs) through first interface 440. In some cases, the first set of signals may be communicated using a BL of 16 bits. In other cases, the first set of signals may be communicated using a BL of 32 bits. In some cases, a BL for the first set of signals may be based on whether the first set of signals is modulated using the first modulation scheme and the second modulation scheme. In some cases, the one or more channels of first interface 440 may be configured to maintain a fixed minimum address length (e.g., thirty-two bytes long minimum address length) of data associated with the first set of signals.

Second interface 445 may be configured to communicate with a main memory of a memory system (e.g., memory media 325 described with reference to FIG. 3). In some cases, second interface 445 may be referred to as a backend interface. In some cases, second interface 445 may include a set of channels (e.g., four (4) channels) that each may be ×16 channel. In some cases, the set of channels may support an industry standard specification e.g., DDR2, DDR3, DDR4, LPDDR2, LPDDR3, LPDDR4, LPDDR5, GDDR4 or GDDR5 specifications, or beyond).

In some cases, second interface 445 may include one or more buffers 446 configured to store data transferred between array 410 and the main memory (e.g., memory media 325). In some cases, each buffer 446 may include four (4) kilo-bytes of memory cells for each channel. Buffers 446 may support an access operation that may be executed out of order based on a set of data associated with the access operation absent from array 410—e.g., the set of data stored in a main memory (e.g., memory media 325). In other cases, buffers 446 may be configured to store data evicted from array 410. Subsequently, the data evicted from array 410 may be transmitted to the main memory (e.g., memory media 325) through second interface 445. In this manner, buffers 446 may support concurrent data management between array 410 and a main memory (e.g., memory media 325). In some cases, second interface 445 may be configured to communicate a second set of signals between array 410 of memory cells and a memory device (e.g., memory media 325) configured for storing information and having a second density of memory cells greater than the first density and a second energy-per-bit rating that may be equal to or greater than the first energy-per-bit rating, where the second set of signals may have been modulated using the second modulation scheme that includes two voltage levels (e.g., NRZ modulation scheme).

Third interface 450 may be configured to communicate with a controller of a memory system. In some cases, third interface 450 may be referred to as part of the frontend interface. In some cases, third interface 450 may be configured to communicate control information (e.g., command and address information) with a controller of a memory system, the control information associated with the first set of signals modulated using either the first modulation scheme or the second modulation scheme. In some cases, memory device 400 may communicate additional information (e.g., information directed to controlling data traffic amongst array 410, a host device, and a main memory) with the controller using additional interface 451. In some cases, memory device 400 may include an interface coupled with a host device and configured for communicating information between array 410 and the host device during a training operation—e.g., fine-tuning parameters of memory device 400 within a memory system to achieve an efficient operating condition when coupled with a host device to support low-energy access operations—e.g., access operations according to the first energy-per-bit rating that may be equal to or less than a second energy-per-bit rating.

In some cases, memory device 400 (e.g., a local memory controller within memory device 400) may receive, from a host device as part of an access operation, command and address information through third interface 450 coupled with a controller of a memory system, where the command and address information may be associated with a set of data stored in array 410. Subsequently, memory device 400 may identify a first mode of operation (e.g., high-bandwidth operation mode) for communicating the set of data with the host device based on receiving the command and address information, where the first mode of operation may be configured for signaling using a first modulation scheme that includes three or more voltage levels (e.g., PAM4 modulation scheme) and a second mode of operation (e.g., normal-bandwidth operation mode) configured for signaling using a second modulation scheme that includes two voltage levels (e.g., NRZ modulation scheme). In some cases, memory device 400 may transmit, to the host device through first interface 440 coupled with the host device, a first set of signals modulated using the first modulation scheme that include the set of data based on operating in the first mode of operation.

In some cases, memory device 400 (e.g., a local memory controller within memory device 400) may receive, from a memory device (e.g., memory media 325) through second interface 445 coupled with the memory device, a second set of signals modulated using the second modulation scheme and that include the set of data from the memory device. Subsequently, memory device 400 may store the set of data in buffer 446 based on receiving the set of data from the memory device. Further, memory device 400 may store the set of data in array 410. In some cases, memory device 400 may transmit the first set of signals based on receiving the second set of signals from the memory device. In some cases, memory device 400 may transmit the first set of signals based on storing the set of data in array 410. In some cases, memory device 400 (e.g., a local memory controller within memory device 400) may activate on-die termination (ODT) component, where transmitting the first set of signals is based on activating the ODT component configured for matching impedances for the first set of signals.

Figure 5:
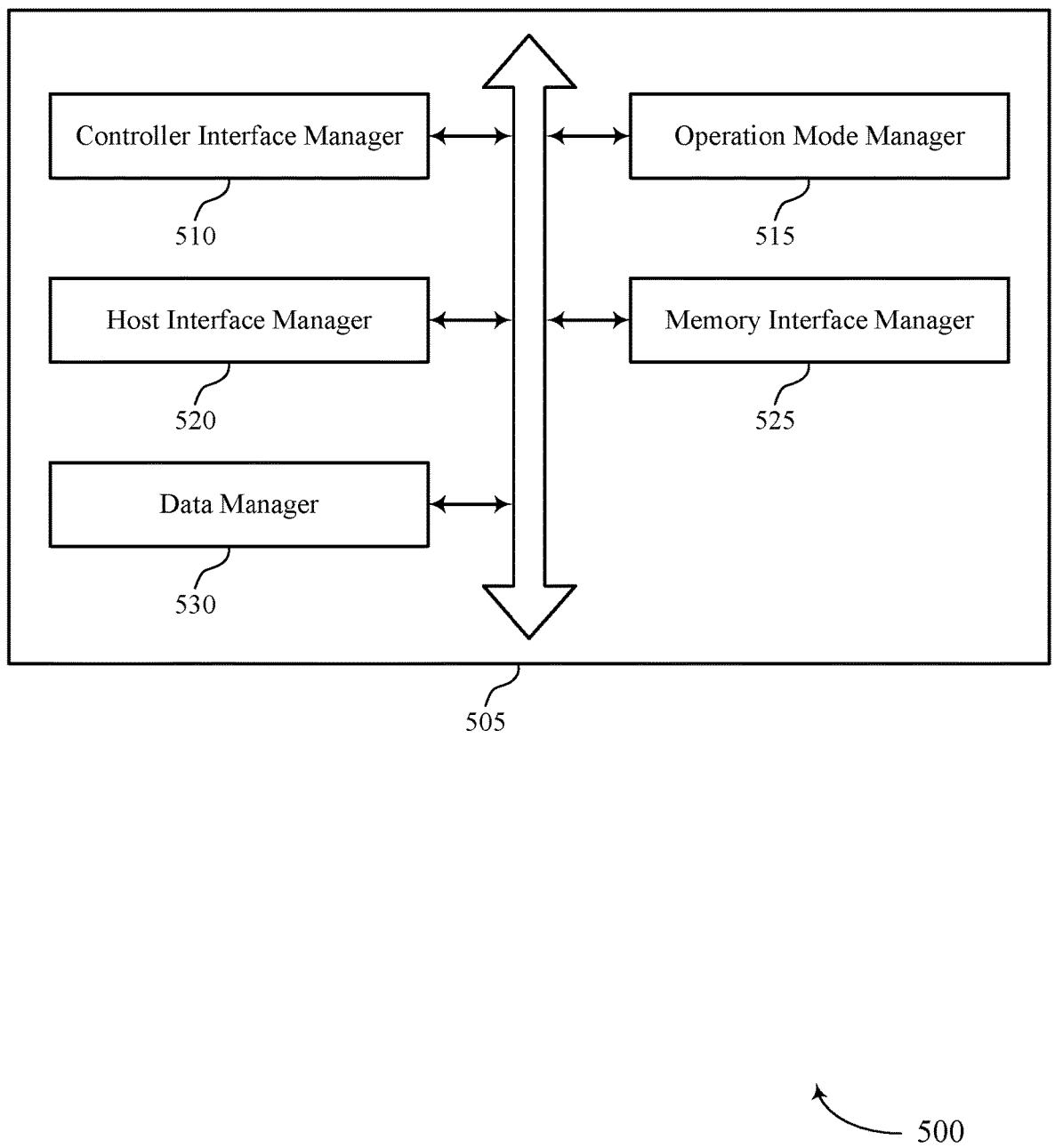
FIG. 5 shows a block diagram of a controller that supports a memory system and operations of the same in accordance with examples as disclosed herein.

FIG. 5 shows a block diagram 500 of a controller 505 that supports memory a system and operations of the same in accordance with examples as disclosed herein. The controller 505 may be an example of aspects of a local memory controller 165 or a local memory controller 260 described with reference to FIGS. 1 and 2. The memory device 400 described with reference to FIG. 4 may include the controller 505. The controller 505 may include a controller interface manager 510, an operation mode manager 515, a host interface manager 520, a memory interface manager 525, and a data manager 530. Each of these modules may communicate, directly or indirectly, with one another (e.g., via one or more buses).

The controller interface manager 510 may receive, from a host device as part of an access operation, command and address information through a first interface coupled with a controller of a memory system, the command and address information associated with a set of data stored in an array of memory cells.

The operation mode manager 515 may identify a first mode of operation for communicating the set of data with the host device based on receiving the command and address information, the first mode of operation configured for signaling using a first modulation scheme that includes three or more voltage levels and a second mode of operation configured for signaling using a second modulation scheme that includes two or fewer voltage levels. In some cases, the first mode of operation includes a first rate of data transmission. In some cases, the second mode of operation includes a second rate of data transmission higher than the first rate of data transmission.

The host interface manager 520 may transmit, to the host device through a second interface coupled with the host device, a first set of signals modulated using the first modulation scheme that include the set of data based on operating in the first mode of operation. In some examples, the host interface manager 520 may activate on-die termination (ODT) component, where transmitting the first set of signals is based on activating the ODT component configured for matching impedances for the first set of signals.

The memory interface manager 525 may receive, from a memory device through a third interface coupled with the memory device, a second set of signals modulated using the second modulation scheme and that include the set of data from the memory device, where transmitting the first set of signals is based on receiving the second set of signals from the memory device.

The data manager 530 may store the set of data in a buffer based on receiving the set of data from the memory device. In some examples, the data manager 530 may store the set of data in the array of memory cells, where transmitting the first set of signals is based on storing the set of data in the array of memory cells.

Figure 6:
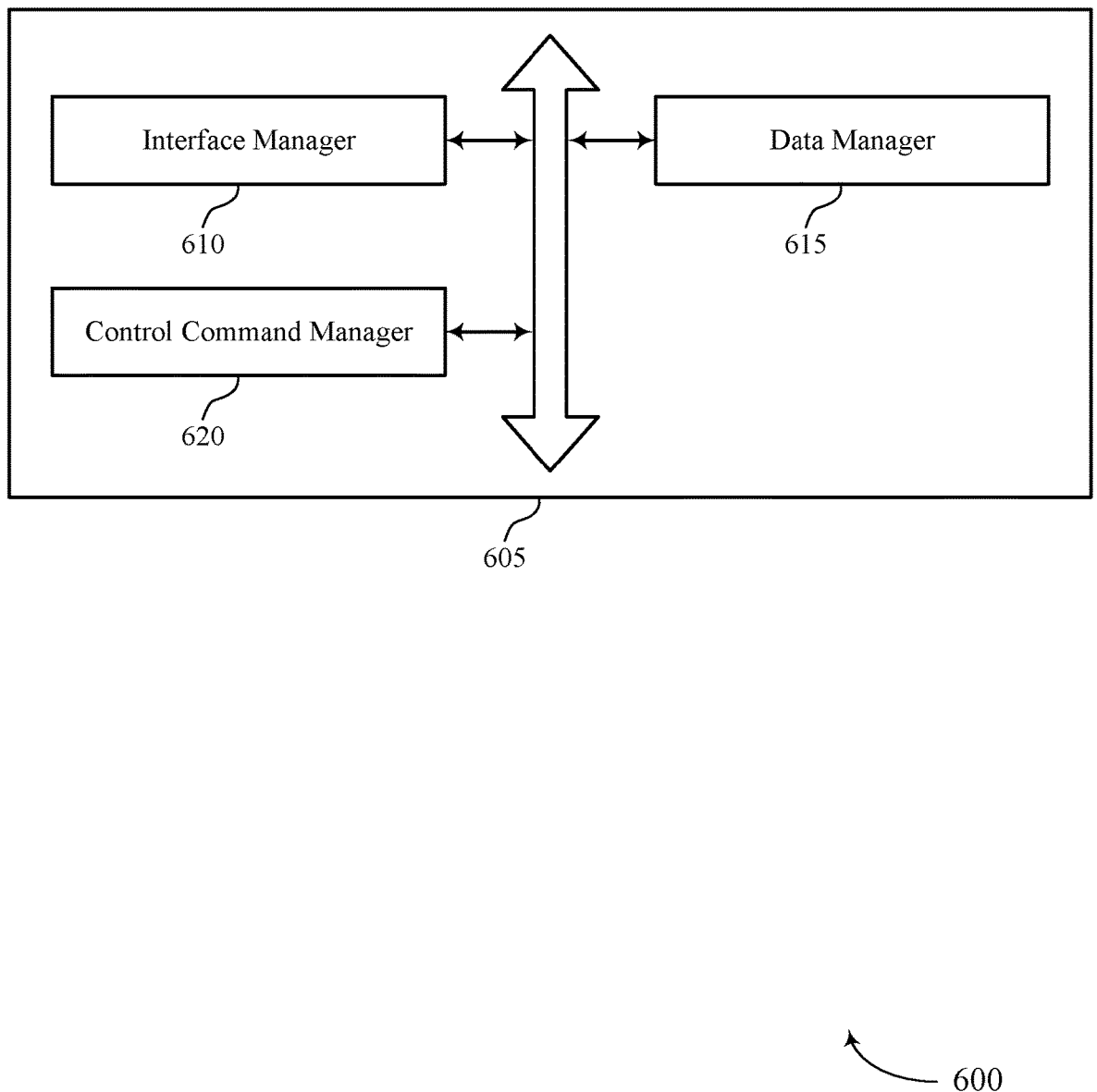
FIG. 6 shows a block diagram of a controller that supports a memory system and operations of the same in accordance with examples as disclosed herein.

FIG. 6 shows a block diagram 600 of a controller 605 that supports a memory system and operations of the same in accordance with examples as disclosed herein. The controller 605 may be an example of aspects of a device memory controller 155 or a controller 320 as described with reference to FIGS. 1 and 3. The controller 605 may include an interface manager 610, a data manager 615, and a control command manager 620. Each of these modules may communicate, directly or indirectly, with one another (e.g., via one or more buses).

The interface manager 610 may receive, from a host device over a first channel, a first signal modulated using a first modulation scheme that includes two or fewer voltage levels, the first signal including command and address information for a set of data stored in a memory system including a first memory device configured for one or more access operations according to a first energy-per-bit rating and a second memory device configured for storing information according to a second energy-per-bit rating that is greater than the first energy-per-bit rating. In some examples, the interface manager 610 may transmit, from the first memory device to the host device over a second channel, a second signal including the set of data based on the determination, the second signal modulated using a second modulation scheme that includes three or more voltage levels.

In some examples, the interface manager 610 may receive, from a host device over a first channel, control information for a set of data stored in a memory system including a first memory device configured for one or more access operations of memory cells in the first memory device according to a first energy-per-bit rating and a second memory device configured for storing information according to a second energy-per-bit rating that is greater than the first energy-per-bit rating, the control information including a logical address of the set of data associated with a read operation. In some examples, the interface manager 610 may transmit, to the host device over the first channel, an indication of increased latency based on determining that the set of data is absent from the first memory device.

In some examples, the interface manager 610 may transmit, to the host device over the first channel, information indicating that at least some access operations according to the first energy-per-bit rating associated with the set of data being executed out of order based on determining that the set of data is absent from the first memory device. In some examples, the interface manager 610 may transmit, to the host device over the first channel, an indication of increased latency based on identifying that the set of data is stored in the second memory device. In some examples, the interface manager 610 may transmit, to the host device over the first channel, transaction identification information configured to support the read operation being executed out of order based on identifying that the set of data is stored in the second memory device.

The data manager 615 may determine whether the set of data is stored in the first memory device based on receiving the command and address information. In some examples, the data manager 615 may determine a location of the set of data in the first memory device or the second memory device based on receiving the control information. In some examples, the data manager 615 may transmit, from the second memory device to the first memory device over a fourth channel, a third signal including the set of data based on determining that the set of data is absent from the first memory device, the third signal modulated using the first modulation scheme.

In some examples, the data manager 615 may identify that the set of data is stored in the first memory device, where determining the location of the set of data in the first memory device is based on identifying that the set of data is stored in the first memory device. In some examples, the data manager 615 may identify that the set of data is stored in the second memory device. In some examples, the data manager 615 may update the logical address of the set of data based on transmitting the second command to the second memory device. In some examples, the data manager 615 may identify that the set of data is stored in the second memory device. In some examples, the data manager 615 may identify that the set of data is stored in the second memory device. In some cases, the second memory device configured for storing information is configured for high-density storage of the information.

The control command manager 620 may transmit, to the first memory device over a second channel, a first command to cause the first memory device to transmit the set of data to the host device over a third channel using a first modulation scheme including three or more voltage levels. In some examples, the control command manager 620 may transmit, to the first memory device over a third channel, the command and address information based on determining that the set of data is stored in the first memory device, where transmitting the second signal is based on transmitting the command and address information to the first memory device.

In some examples, the control command manager 620 may transmit, to the second memory device over a fifth channel, the command and address information based on determining that the set of data is absent from the first memory device, where transmitting the third signal from the second memory device to the first memory device is based on transmitting the command and address information to the second memory device.

In some examples, the control command manager 620 may transmit, to the second memory device over a fourth channel, a second command to cause the second memory device to transmit the set of data to the first memory device over a fifth channel using a second modulation scheme including two or fewer voltage levels, based on identifying that the set of data is stored in the second memory device.

Figure 7:
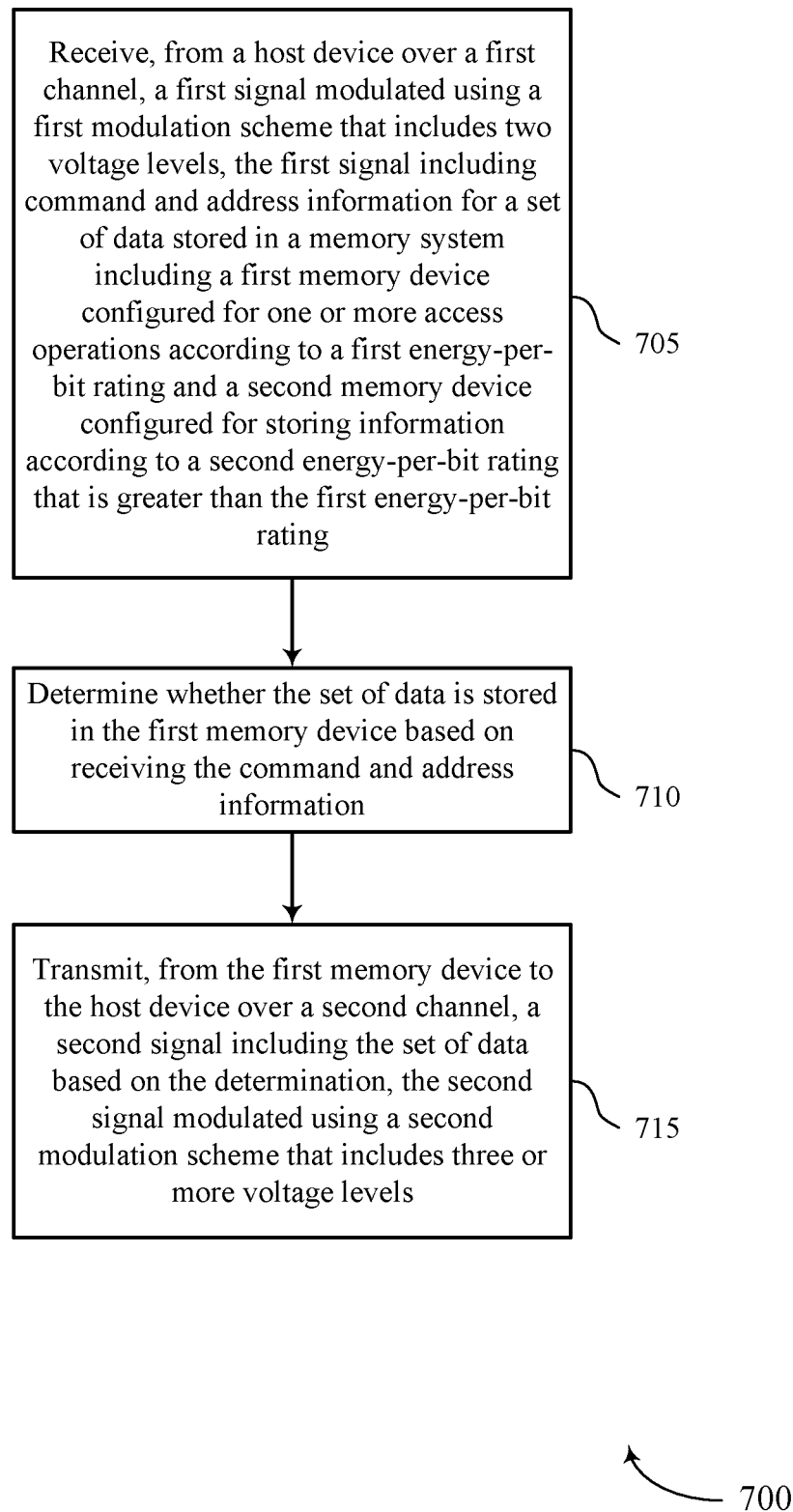
FIGS. 7 through 9 show flowcharts illustrating a method or methods that support a memory system and operations of the same in accordance with examples as disclosed herein.

FIG. 7 shows a flowchart illustrating a method or methods 700 that supports a memory system and operations of the same in accordance with examples as disclosed herein. The operations of method 700 may be implemented by a controller or its components as described herein. For example, the operations of method 700 may be performed by a controller 605 as described with reference to FIG. 6. In some examples, the controller may execute a set of instructions to control the functional elements of a memory system to perform the described functions. Additionally or alternatively, the controller may perform aspects of the described functions using special-purpose hardware.

At 705, the controller may receive, from a host device over a first channel, a first signal modulated using a first modulation scheme that includes two voltage levels, the first signal including command and address information for a set of data stored in a memory system including a first memory device configured for one or more access operations according to a first energy-per-bit rating and a second memory device configured for storing information according to a second energy-per-bit rating that is greater than the first energy-per-bit rating. The operations of 705 may be performed according to the methods described herein. In some examples, aspects of the operations of 705 may be performed by an interface manager as described with reference to FIG. 6.

At 710, the controller may determine whether the set of data is stored in the first memory device based on receiving the command and address information. The operations of 710 may be performed according to the methods described herein. In some examples, aspects of the operations of 710 may be performed by a data manager as described with reference to FIG. 6.

At 715, the controller may transmit, from the first memory device to the host device over a second channel, a second signal including the set of data based on the determination, the second signal modulated using a second modulation scheme that includes three or more voltage levels. The operations of 715 may be performed according to the methods described herein. In some examples, aspects of the operations of 715 may be performed by an interface manager as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving, from a host device over a first channel, a first signal modulated using a first modulation scheme that includes two voltage levels, the first signal including command and address information for a set of data stored in a memory system including a first memory device configured for one or more access operations according to a first energy-per-bit rating and a second memory device configured for storing information according to a second energy-per-bit rating that is greater than the first energy-per-bit rating, determining whether the set of data is stored in the first memory device based on receiving the command and address information, and transmitting, from the first memory device to the host device over a second channel, a second signal including the set of data based on the determination, the second signal modulated using a second modulation scheme that includes three or more voltage levels.

Some examples of the method 700 and the apparatus described herein may further include operations, features, means, or instructions for transmitting, to the first memory device over a third channel, the command and address information based on determining that the set of data may be stored in the first memory device, where transmitting the second signal may be based on transmitting the command and address information to the first memory device.

Some examples of the method 700 and the apparatus described herein may further include operations, features, means, or instructions for transmitting, from the second memory device to the first memory device over a fourth channel, a third signal including the set of data based on determining that the set of data may be absent from the first memory device, the third signal modulated using the first modulation scheme.

Some examples of the method 700 and the apparatus described herein may further include operations, features, means, or instructions for transmitting, to the second memory device over a fifth channel, the command and address information based on determining that the set of data may be absent from the first memory device, where transmitting the third signal from the second memory device to the first memory device may be based on transmitting the command and address information to the second memory device.

Some examples of the method 700 and the apparatus described herein may further include operations, features, means, or instructions for transmitting, to the host device over the first channel, an indication of increased latency based on determining that the set of data may be absent from the first memory device.

Some examples of the method 700 and the apparatus described herein may further include operations, features, means, or instructions for transmitting, to the host device over the first channel, information indicating that at least some access operations according to the first energy-per-bit rating associated with the set of data being executed out of order based on determining that the set of data may be absent from the first memory device.

Figure 8:
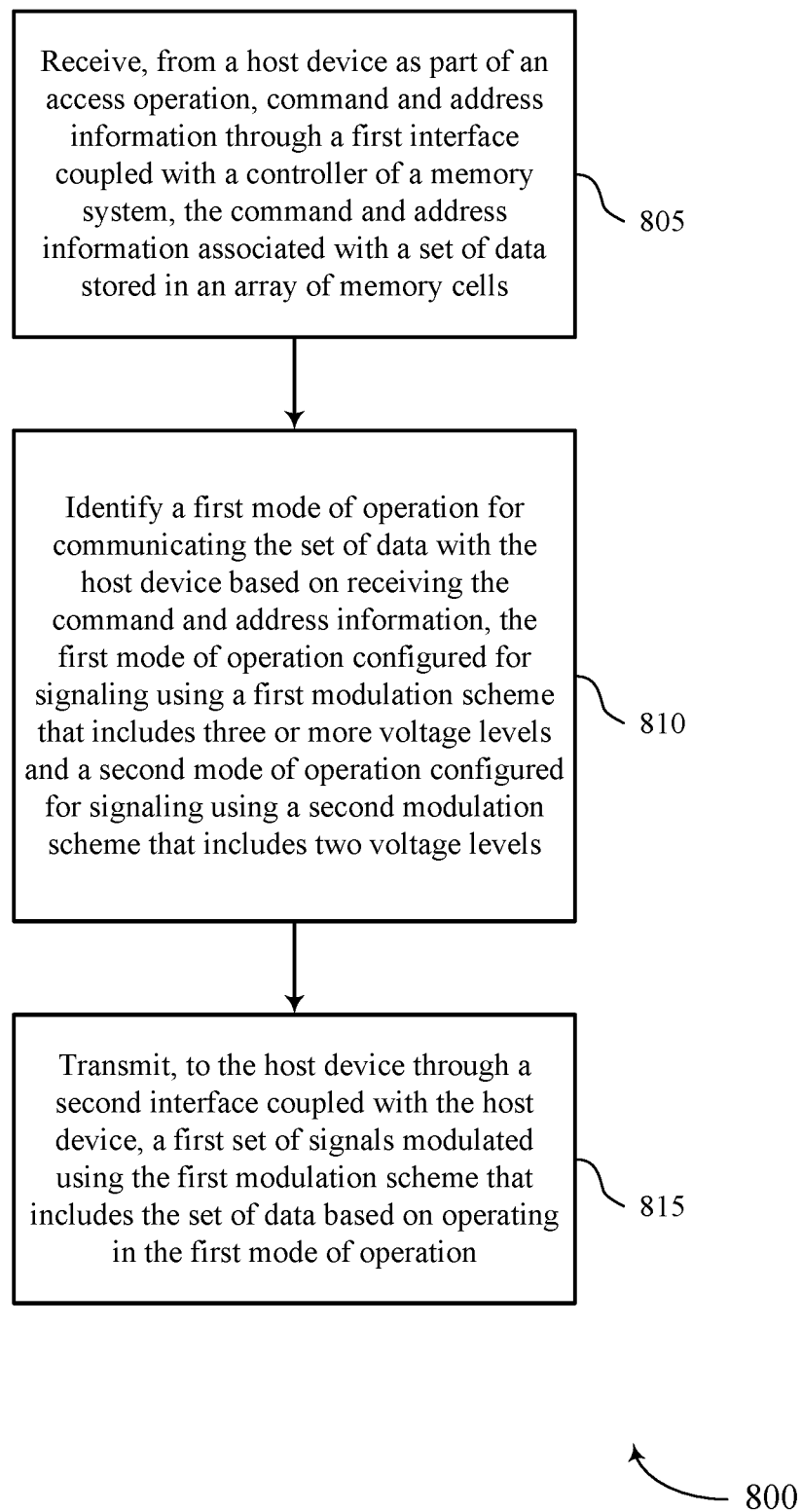

FIG. 8 shows a flowchart illustrating a method or methods 800 that supports a memory system and operations of the same in accordance with examples as disclosed herein. The operations of method 800 may be implemented by a controller or its components as described herein. For example, the operations of method 800 may be performed by a controller 505 as described with reference to FIG. 5. In some examples, the controller may execute a set of instructions to control the functional elements of a memory device to perform the described functions. Additionally or alternatively, the controller may perform aspects of the described functions using special-purpose hardware.

At 805, the controller may receive, from a host device as part of an access operation, command and address information through a first interface coupled with a controller of a memory system, the command and address information associated with a set of data stored in an array of memory cells. The operations of 805 may be performed according to the methods described herein. In some examples, aspects of the operations of 805 may be performed by a controller interface manager as described with reference to FIG. 5.

At 810, the controller may identify a first mode of operation for communicating the set of data with the host device based on receiving the command and address information, the first mode of operation configured for signaling using a first modulation scheme that includes three or more voltage levels and a second mode of operation configured for signaling using a second modulation scheme that includes two voltage levels. The operations of 810 may be performed according to the methods described herein. In some examples, aspects of the operations of 810 may be performed by an operation mode manager as described with reference to FIG. 5.

At 815, the controller may transmit, to the host device through a second interface coupled with the host device, a first set of signals modulated using the first modulation scheme that includes the set of data based on operating in the first mode of operation. The operations of 815 may be performed according to the methods described herein. In some examples, aspects of the operations of 815 may be performed by a host interface manager as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for receiving, from a host device as part of an access operation, command and address information through a first interface coupled with a controller of a memory system, the command and address information associated with a set of data stored in an array of memory cells, identifying a first mode of operation for communicating the set of data with the host device based on receiving the command and address information, the first mode of operation configured for signaling using a first modulation scheme that includes three or more voltage levels and a second mode of operation configured for signaling using a second modulation scheme that includes two voltage levels, and transmitting, to the host device through a second interface coupled with the host device, a first set of signals modulated using the first modulation scheme that include the set of data based on operating in the first mode of operation.

Some examples of the method 800 and the apparatus described herein may further include operations, features, means, or instructions for receiving, from a memory device through a third interface coupled with the memory device, a second set of signals modulated using the second modulation scheme and that include the set of data from the memory device, where transmitting the first set of signals may be based on receiving the second set of signals from the memory device.

Some examples of the method 800 and the apparatus described herein may further include operations, features, means, or instructions for storing the set of data in a buffer based on receiving the set of data from the memory device.

Some examples of the method 800 and the apparatus described herein may further include operations, features, means, or instructions for storing the set of data in the array of memory cells, where transmitting the first set of signals may be based on storing the set of data in the array of memory cells.

Some examples of the method 800 and the apparatus described herein may further include operations, features, means, or instructions for activating on-die termination (ODT) component, where transmitting the first set of signals may be based on activating the ODT component configured for matching impedances for the first set of signals.

In some examples of the method 800 and the apparatus described herein, the first mode of operation includes a first rate of data transmission, and the second mode of operation includes a second rate of data transmission higher than the first rate of data transmission.

Figure 9:
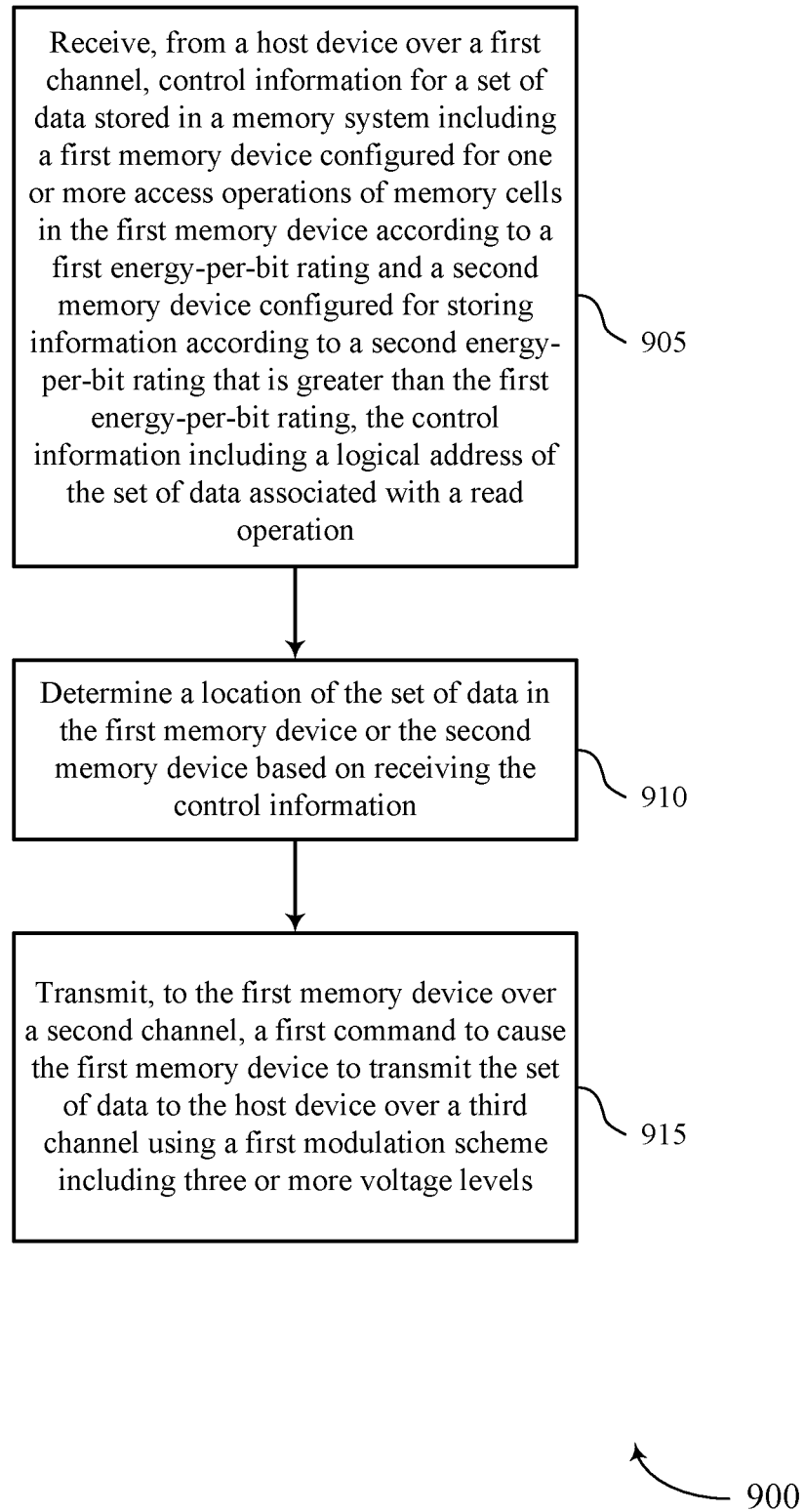

FIG. 9 shows a flowchart illustrating a method or methods 900 that supports a memory system and operations of the same in accordance with examples as disclosed herein. The operations of method 900 may be implemented by a controller or its components as described herein. For example, the operations of method 900 may be performed by a controller 605 as described with reference to FIG. 6. In some examples, the controller may execute a set of instructions to control the functional elements of a memory system to perform the described functions. Additionally or alternatively, the controller may perform aspects of the described functions using special-purpose hardware.

At 905, the controller may receive, from a host device over a first channel, control information for a set of data stored in a memory system including a first memory device configured for one or more access operations of memory cells in the first memory device according to a first energy-per-bit rating and a second memory device configured for storing information according to a second energy-per-bit rating that is greater than the first energy-per-bit rating, the control information including a logical address of the set of data associated with a read operation. The operations of 905 may be performed according to the methods described herein. In some examples, aspects of the operations of 905 may be performed by an interface manager as described with reference to FIG. 6.

At 910, the controller may determine a location of the set of data in the first memory device or the second memory device based on receiving the control information. The operations of 910 may be performed according to the methods described herein. In some examples, aspects of the operations of 910 may be performed by a data manager as described with reference to FIG. 6.

At 915, the controller may transmit, to the first memory device over a second channel, a first command to cause the first memory device to transmit the set of data to the host device over a third channel using a first modulation scheme including three or more voltage levels. The operations of 915 may be performed according to the methods described herein. In some examples, aspects of the operations of 915 may be performed by a control command manager as described with reference to FIG. 6.

In some examples, an apparatus as described herein may perform a method or methods, such as the method 900. The apparatus may include features, means, or instructions (e.g., a non-transitory computer-readable medium storing instructions executable by a processor) for receiving, from a host device over a first channel, control information for a set of data stored in a memory system including a first memory device configured for one or more access operations of memory cells in the first memory device according to a first energy-per-bit rating and a second memory device configured for storing information according to a second energy-per-bit rating that is greater than the first energy-per-bit rating, the control information including a logical address of the set of data associated with a read operation, determining a location of the set of data in the first memory device or the second memory device based on receiving the control information, and transmitting, to the first memory device over a second channel, a first command to cause the first memory device to transmit the set of data to the host device over a third channel using a first modulation scheme including three or more voltage levels.

Some examples of the method 900 and the apparatus described herein may further include operations, features, means, or instructions for identifying that the set of data may be stored in the first memory device, where determining the location of the set of data in the first memory device may be based on identifying that the set of data may be stored in the first memory device.

Some examples of the method 900 and the apparatus described herein may further include operations, features, means, or instructions for identifying that the set of data may be stored in the second memory device, and transmitting, to the second memory device over a fourth channel, a second command to cause the second memory device to transmit the set of data to the first memory device over a fifth channel using a second modulation scheme including two voltage levels, based on identifying that the set of data may be stored in the second memory device.

Some examples of the method 900 and the apparatus described herein may further include operations, features, means, or instructions for updating the logical address of the set of data based on transmitting the second command to the second memory device.

Some examples of the method 900 and the apparatus described herein may further include operations, features, means, or instructions for identifying that the set of data may be stored in the second memory device, and transmitting, to the host device over the first channel, an indication of increased latency based on identifying that the set of data may be stored in the second memory device.

Some examples of the method 900 and the apparatus described herein may further include operations, features, means, or instructions for identifying that the set of data may be stored in the second memory device, and transmitting, to the host device over the first channel, transaction identification information configured to support the read operation being executed out of order based on identifying that the set of data may be stored in the second memory device.

In some examples of the method 900 and the apparatus described herein, the second memory device configured for storing information may be configured for high-density storage of the information.

It should be noted that the methods described above describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a first memory device comprising a first plurality of memory cells, the first memory device configured for one or more access operations of the first plurality of memory cells according to a first energy-per-bit rating;
   a second memory device coupled with the first memory device and comprising a second plurality of memory cells, the second memory device configured for storing information using the second plurality of memory cells according to a second energy-per-bit rating that is greater than the first energy-per-bit rating;
   a first channel coupled with the first memory device and configured to communicate a first signal between the first memory device and a host device, the first signal modulated using a first modulation scheme that includes three or more voltage levels; and
   a second channel coupled with the first memory device and the second memory device and configured to communicate a second signal between the first memory device and the second memory device that is modulated using a second modulation scheme that includes two voltage levels.

2. The apparatus of claim 1, further comprising:
   a controller coupled with the first memory device, and the second memory device, and configured to receive control information from the host device, the controller configured to determine whether data indicated by the control information is stored in the first memory device or the second memory device.

3. The apparatus of claim 2, further comprising:
   a third channel configured to communicate the control information associated with the one or more access operations according to the first energy-per-bit rating between the controller and the host device, wherein the control information is modulated using the second modulation scheme.

4. The apparatus of claim 3, further comprising:
   a fourth channel configured to communicate the control information between the controller and the second memory device via signals modulated using the second modulation scheme.

5. The apparatus of claim 2, wherein the controller is configured to transmit, to the first memory device using the first modulation scheme, a command to cause the first memory device to transmit the data to the host device based at least in part on determining whether the data is stored in the first memory device or the second memory device.

6. The apparatus of claim 1, wherein:
   the first plurality of memory cells comprises dynamic random access memory (DRAM) cells; and
   the second plurality of memory cells comprises ferroelectric random access memory (FeRAM) cells or phase change memory (PCM) cells, or any combination thereof.

7. The apparatus of claim 1, wherein the first memory device comprises a plurality of conductive paths configured for the one or more access operations of the first plurality of memory cells.

8. A method, comprising:
   receiving, from a host device over a first channel, a first signal modulated using a first modulation scheme that includes two voltage levels, the first signal including command and address information for a set of data stored in a memory system comprising a first memory device configured for one or more access operations according to a first energy-per-bit rating and a second memory device configured for storing information according to a second energy-per-bit rating that is greater than the first energy-per-bit rating;
   determining whether the set of data is stored in the first memory device based at least in part on receiving the command and address information; and
   transmitting, from the first memory device to the host device over a second channel, a second signal comprising the set of data based at least in part on the determination, the second signal modulated using a second modulation scheme that includes three or more voltage levels.

9. The method of claim 8, further comprising:
   transmitting, to the first memory device over a third channel, the command and address information based at least in part on determining that the set of data is stored in the first memory device, wherein transmitting the second signal is based at least in part on transmitting the command and address information to the first memory device.

10. The method of claim 8, further comprising:
    transmitting, from the second memory device to the first memory device over a fourth channel, a third signal comprising the set of data based at least in part on determining that the set of data is absent from the first memory device, the third signal modulated using the first modulation scheme.

11. The method of claim 10, further comprising:
    transmitting, to the second memory device over a fifth channel, the command and address information based at least in part on determining that the set of data is absent from the first memory device, wherein transmitting the third signal from the second memory device to the first memory device is based at least in part on transmitting the command and address information to the second memory device.

12. The method of claim 8, further comprising:
    transmitting, to the host device over the first channel, an indication of increased latency based at least in part on determining that the set of data is absent from the first memory device.

13. The method of claim 8, further comprising:
transmitting, to the host device over the first channel, information indicating that at least some access operations according to the first energy-per-bit rating associated with the set of data are executed out of order based at least in part on determining that the set of data is absent from the first memory device.

14. An apparatus, comprising:
an array of memory cells that comprises conductive paths configured for one or more access operations of the array of memory cells having a first density and a first energy-per-bit rating;
a first interface configured to communicate a first set of signals between the array of memory cells and a host device, the first set of signals modulated using a first modulation scheme that includes three or more voltage levels; and
a second interface configured to communicate a second set of signals between the array of memory cells and a memory device configured for storing information and having a second density of memory cells greater than the first density and a second energy-per-bit rating that is equal to or greater than the first energy-per-bit rating, the second set of signals modulated using a second modulation scheme that includes two voltage levels.

15. The apparatus of claim 14, wherein the first interface comprises one or more channels configured to carry the first set of signals, wherein the first set of signals are capable of being modulated using the first modulation scheme or the second modulation scheme.

16. The apparatus of claim 15, wherein the first set of signals are communicated using a plurality of different burst lengths based at least in part on whether the first set of signals is modulated using the first modulation scheme and the second modulation scheme.

17. The apparatus of claim 15, wherein the one or more channels are configured to maintain a fixed minimum address length of data associated with the first set of signals.

18. The apparatus of claim 14, wherein the second interface comprises one or more buffers configured to store data transferred between the array of memory cells and the memory device.

19. The apparatus of claim 18, wherein the one or more buffers are configured to store data evicted from the array of memory cells.

20. The apparatus of claim 14, further comprising:
a third interface configured to communicate control information with a controller of a memory system, the control information associated with the first set of signals modulated using either the first modulation scheme or the second modulation scheme.

21. The apparatus of claim 20, further comprising:
a fourth interface coupled with the host device and configured for communicating information between the array of memory cells and the host device during a training operation.

22. The apparatus of claim 14, wherein the conductive paths comprise access lines associated with memory cells of the array of memory cells, or one or more conductive components located between the memory cells and the first interface, or both.

23. A method, comprising:
receiving, from a host device as part of an access operation, command and address information through a first interface coupled with a controller of a memory system, the command and address information associated with a set of data stored in an array of memory cells;
identifying a first mode of operation for communicating the set of data with the host device based at least in part on receiving the command and address information, the first mode of operation configured for signaling using a first modulation scheme that includes three or more voltage levels and a second mode of operation configured for signaling using a second modulation scheme that includes two voltage levels; and
transmitting, to the host device through a second interface coupled with the host device, a first set of signals modulated using the first modulation scheme that includes the set of data based at least in part on operating in the first mode of operation.

24. The method of claim 23, further comprising:
receiving, from a memory device through a third interface coupled with the memory device, a second set of signals modulated using the second modulation scheme and that include the set of data from the memory device, wherein transmitting the first set of signals is based at least in part on receiving the second set of signals from the memory device.

25. The method of claim 24, further comprising:
storing the set of data in a buffer based at least in part on receiving the set of data from the memory device.

26. The method of claim 25, further comprising:
storing the set of data in the array of memory cells, wherein transmitting the first set of signals is based at least in part on storing the set of data in the array of memory cells.

27. The method of claim 23, further comprising:
activating on-die termination (ODT) component, wherein transmitting the first set of signals is based at least in part on activating the ODT component configured for matching impedances for the first set of signals.

28. The method of claim 23, wherein:
the first mode of operation comprises a first rate of data transmission; and
the second mode of operation comprises a second rate of data transmission higher than the first rate of data transmission.

29. A method, comprising:
receiving, from a host device over a first channel, control information for a set of data stored in a memory system comprising a first memory device configured for one or more access operations of memory cells in the first memory device according to a first energy-per-bit rating and a second memory device configured for storing information according to a second energy-per-bit rating that is greater than the first energy-per-bit rating, the control information comprising a logical address of the set of data associated with a read operation;
determining a location of the set of data in the first memory device or the second memory device based at least in part on receiving the control information; and
transmitting, to the first memory device over a second channel, a first command to cause the first memory device to transmit the set of data to the host device over a third channel using a first modulation scheme comprising three or more voltage levels.

30. The method of claim 29, further comprising:
identifying that the set of data is stored in the first memory device, wherein determining the location of the set of data in the first memory device is based at least in part on identifying that the set of data is stored in the first memory device.

31. The method of claim 29, further comprising:
identifying that the set of data is stored in the second memory device; and
transmitting, to the second memory device over a fourth channel, a second command to cause the second memory device to transmit the set of data to the first memory device over a fifth channel using a second modulation scheme comprising two voltage levels, based at least in part on identifying that the set of data is stored in the second memory device.

32. The method of claim 31, further comprising:
updating the logical address of the set of data based at least in part on transmitting the second command to the second memory device.

33. The method of claim 29, further comprising:
identifying that the set of data is stored in the second memory device; and
transmitting, to the host device over the first channel, an indication of increased latency based at least in part on identifying that the set of data is stored in the second memory device.

34. The method of claim 29, further comprises:
identifying that the set of data is stored in the second memory device; and
transmitting, to the host device over the first channel, transaction identification information configured to support the read operation being executed out of order based at least in part on identifying that the set of data is stored in the second memory device.

35. The method of claim 29, wherein the second memory device configured for storing information is configured for high-density storage of the information.

* * * * *